United States Patent
Chanez et al.

(10) Patent No.: US 10,121,151 B2
(45) Date of Patent: Nov. 6, 2018

(54) METHOD AND APPARATUS FOR MARKING MANUFACTURED ITEMS USING PHYSICAL CHARACTERISTIC

(71) Applicant: INEXTO SA, Lausanne (CH)

(72) Inventors: Patrick Chanez, Cheyres (CH); Erwan Fradet, Grandvaux (CH)

(73) Assignee: INEXTO S.A., Lausanne (CH)

( * ) Notice: Subject to any disclaimer, the term of this patent is extended or adjusted under 35 U.S.C. 154(b) by 495 days.

(21) Appl. No.: 14/648,351

(22) PCT Filed: Dec. 16, 2013

(86) PCT No.: PCT/EP2013/076725
§ 371 (c)(1),
(2) Date: May 29, 2015

(87) PCT Pub. No.: WO2014/095737
PCT Pub. Date: Jun. 26, 2014

(65) Prior Publication Data
US 2015/0317644 A1 Nov. 5, 2015

(30) Foreign Application Priority Data
Dec. 17, 2012 (EP) .................................... 12197525

(51) Int. Cl.
*H04L 29/06* (2006.01)
*G06Q 30/00* (2012.01)
(Continued)

(52) U.S. Cl.
CPC ........... *G06Q 30/0185* (2013.01); *G09C 5/00* (2013.01); *H04L 9/00* (2013.01); *H04L 9/0861* (2013.01);
(Continued)

(58) Field of Classification Search
CPC ..... G06Q 30/0185; H04L 9/0861; H04L 9/00; H04L 2209/122; G09C 5/00; G06C 2220/10
See application file for complete search history.

(56) References Cited

U.S. PATENT DOCUMENTS 1,686,585 A 10/1925 Vernam
3,636,318 A 1/1972 Lindstrom
(Continued)

FOREIGN PATENT DOCUMENTS

CN 1430175 7/2003
CN 102163291 8/2011
(Continued)

OTHER PUBLICATIONS

PCT International Preliminary Report on Patentability for PCT/EP2013/076725 dated Jun. 23, 2015 (7 pages).
(Continued)

*Primary Examiner* — John B King
(74) *Attorney, Agent, or Firm* — Mueting, Raasch & Gebhardt, P.A.

(57) ABSTRACT

A method of marking a manufactured item is described, comprising: creating a unique product identifier for a manufactured item; creating one or more encryption keys; generating a secret key using the unique product identifier and the one or more encryption keys; generating a system noise value by performing a hash function on the secret key and the unique product identifier; generating a physical key from a measured physical property of the manufactured item; generating a physical noise value by performing a hash function on the physical key and the unique product identifier; generating a secure identifier derived from or incorporating the system noise value and the physical noise value; and placing a mark on the manufactured item, the mark comprising the secure identifier or an identifier derived from
(Continued)

the secure identifier. Also described are methods of authenticating items marked in accordance with the described method.

24 Claims, 6 Drawing Sheets

(51) Int. Cl.
 H04L 9/08 (2006.01)
 G09C 5/00 (2006.01)
 H04L 9/00 (2006.01)
(52) U.S. Cl.
 CPC .... G06Q 2220/10 (2013.01); H04L 2209/122 (2013.01)

(56) References Cited

U.S. PATENT DOCUMENTS

| | | | |
|---|---|---|---|
| 4,114,032 A | 9/1978 | Brosow |
| 4,218,674 A | 8/1980 | Brosow |
| 4,290,630 A | 9/1981 | Lee |
| 4,423,415 A | 12/1983 | Goldman |
| 4,629,215 A | 12/1986 | Maurer |
| 4,661,983 A | 4/1987 | Knop |
| 4,682,794 A | 7/1987 | Margolin |
| 4,686,527 A | 8/1987 | Goldman |
| 4,738,473 A | 4/1988 | Meloni |
| 4,807,287 A | 2/1989 | Tucker |
| 4,820,912 A | 4/1989 | Samyn |
| 4,837,840 A | 6/1989 | Goldman |
| 5,089,712 A | 2/1992 | Holland |
| 5,325,167 A | 6/1994 | Melen |
| 5,354,097 A | 10/1994 | Tel |
| 5,412,718 A | 5/1995 | Narasimhalu |
| 5,509,692 A | 4/1996 | Oz |
| 5,576,825 A | 11/1996 | Nakajima |
| 5,581,257 A | 12/1996 | Greene |
| 5,601,931 A | 2/1997 | Hoshino |
| 5,621,219 A | 4/1997 | Van Renesse |
| 5,719,939 A | 2/1998 | Tel |
| 5,756,220 A | 5/1998 | Hoshino |
| 5,790,025 A | 8/1998 | Amer |
| 5,870,469 A | 2/1999 | Albert |
| 5,903,340 A | 5/1999 | Lawandy |
| 6,106,021 A | 8/2000 | Phillips |
| 6,135,355 A | 10/2000 | Han |
| 6,212,638 B1 | 4/2001 | Lee |
| 6,286,761 B1 | 9/2001 | Wen |
| 6,357,656 B1 | 3/2002 | Puff |
| 6,394,358 B1 | 5/2002 | Thaxton |
| 6,505,779 B1 | 1/2003 | Power |
| 6,530,602 B1 | 3/2003 | Stenzel |
| 6,535,618 B1 | 3/2003 | Rhoads |
| 6,565,002 B1 | 5/2003 | Tel |
| 6,584,214 B1 | 6/2003 | Pappu |
| 6,588,672 B1 | 7/2003 | Usami |
| 6,659,353 B1 | 12/2003 | Okamoto |
| 6,804,379 B2 | 10/2004 | Rhoads |
| 6,925,192 B2 | 8/2005 | Honsinger |
| 6,928,552 B1 | 8/2005 | Mischenko |
| 6,978,036 B2 | 12/2005 | Alattar |
| 7,028,188 B1 | 4/2006 | Moore |
| 7,089,420 B1 | 8/2006 | Durst |
| 7,188,258 B1 | 3/2007 | Aggarwal |
| 7,239,734 B2 | 7/2007 | Alattar |
| 7,606,557 B2 | 10/2009 | Park |
| 7,796,759 B2 | 9/2010 | Wuidart |
| 7,991,157 B2 | 8/2011 | Rhoads |
| 8,171,567 B1 | 5/2012 | Fraser |
| 8,606,716 B2 | 12/2013 | Wilde |
| 2001/0037455 A1 | 11/2001 | Lawandy |
| 2002/0008380 A1 | 1/2002 | Taylor |
| 2002/0030360 A1 | 3/2002 | Herrmann |
| 2002/0061120 A1 | 5/2002 | Carr |
| 2003/0138128 A1 | 7/2003 | Rhoads |
| 2003/0164611 A1 | 9/2003 | Schneider |
| 2004/0113420 A1 | 6/2004 | Han |
| 2005/0047593 A1 | 3/2005 | Hampp |
| 2005/0067489 A1 | 3/2005 | Jones |
| 2005/0224203 A1 | 10/2005 | Boehm |
| 2005/0257064 A1 | 11/2005 | Boutant |
| 2005/0262350 A1 | 11/2005 | Boutant |
| 2005/0269818 A1 | 12/2005 | Forde |
| 2006/0002550 A1 | 1/2006 | Campagna |
| 2006/0133653 A1 | 6/2006 | Sznba |
| 2006/0212946 A1 | 9/2006 | Boulay |
| 2007/0194934 A1 | 8/2007 | Tauber |
| 2008/0046263 A1 | 2/2008 | Sager |
| 2009/0008924 A1 | 1/2009 | Ophey |
| 2009/0074231 A1 | 3/2009 | Rancien |
| 2009/0188970 A1 | 7/2009 | Gouelibo |
| 2009/0257619 A1 | 10/2009 | Boutant |
| 2009/0318186 A1 | 12/2009 | Boutant |
| 2010/0231894 A1 | 9/2010 | Becker |
| 2013/0114903 A1 | 5/2013 | Boutant |
| 2015/0028579 A1 | 1/2015 | Boutant |
| 2015/0257064 A1 | 9/2015 | Lundqvist |
| 2015/0313284 A1 | 11/2015 | Liu |
| 2016/0009468 A1 | 1/2016 | Rancien |

FOREIGN PATENT DOCUMENTS

| | | |
|---|---|---|
| DE | 102007036212 | 2/2009 |
| EP | 0583709 | 2/1994 |
| EP | 0589195 | 3/1994 |
| EP | 0625766 | 11/1994 |
| EP | 0690939 | 1/1996 |
| EP | 0570162 | 2/1999 |
| EP | 0682328 | 8/1999 |
| EP | 1139302 | 10/2001 |
| EP | 1202225 | 5/2002 |
| EP | 1239413 | 9/2002 |
| FR | 2324060 | 4/1977 |
| FR | 2765014 | 12/1998 |
| FR | 2778483 | 11/1999 |
| FR | 2804783 | 8/2001 |
| FR | 2848318 | 2/2005 |
| GB | 2324065 | 10/1998 |
| JP | H7214955 | 8/1995 |
| JP | H0969259 | 3/1997 |
| JP | H11212454 | 8/1999 |
| JP | 200148950 | 5/2000 |
| JP | 2003/345930 | 12/2003 |
| JP | 2006-52488 | 2/2006 |
| JP | 2006-205674 | 8/2006 |
| WO | WO 95/10420 | 4/1995 |
| WO | WO 97/24699 | 7/1997 |
| WO | WO 99/174486 | 4/1999 |
| WO | WO 01/43086 | 6/2001 |
| WO | WO 01/091007 | 11/2001 |
| WO | WO 02/02350 | 1/2002 |
| WO | WO 02/50790 | 6/2002 |
| WO | WO 03/052701 | 6/2003 |
| WO | WO 03/054297 | 7/2003 |
| WO | WO 2004/069562 | 8/2004 |
| WO | WO 2005/010814 | 2/2005 |
| WO | WO 2005/025891 | 3/2005 |
| WO | WO 2006/084090 | 8/2006 |
| WO | WO 2007/071788 | 6/2007 |
| WO | WO 2010/058131 | 5/2010 |
| WO | WO 2012/040481 | 3/2012 |
| WO | WO 2012/089582 | 7/2012 |
| WO | WO 2014/054035 | 4/2014 |

OTHER PUBLICATIONS

European Extended Search Report for Application No. 12197525.4-1860 dated Jun. 3, 2013 (8 pages).
PCT Search Report and Written Opinion for PCT/EP2013/076725 dated Feb. 20, 2014 (12 pages).
Lehtonen, Mikko et al., "Features, Identity, Tracing and Cryptography in Product Authentication", The 13th International Conference

(56) References Cited

OTHER PUBLICATIONS on Concurrent Enterprising: Concurrent Innovation: An Emerging Paradigm for Collaboration and Competitiveness in the Extended Enterprise, Centre for Concurrent Entrpri, Jun. 4, 2007, pp. 1-8, XP002560506, retrieved from the Internet: http://www.stop-project.eu/Portals/1/publications/ICE07_SToP_ProdAuth.pdf [retrieved on Dec. 15, 2009].

Douglass, "The Vernam One-Time Pad System, and Some Technical Notes on the "Secure" Vernam Pseudorandom Keystream Generator", Copyright 1996, pp. 1-15.

Frykholm et al. "Error-Tolerant Password Recovery", CCS'01, Nov. 5-8, 2001, Philiadelphia, PA, USA.

Jain et al, "Biometrics: A Grand Challenge", Proceedings of the 17th International Conference on Pattern Recognition (ICPR'04).

Krawczyk et al., "HMAC: Keyed-Hashing for Message Authentication", Feb. 1997.

Tsuji et al., "Ciper Ans Information Security", 156-158, Mar. 28, 1990.

METHOD AND APPARATUS FOR MARKING MANUFACTURED ITEMS USING PHYSICAL CHARACTERISTIC

This application is a U.S. National Stage Application of International Application No. PCT/EP2013/076725, filed Dec. 16, 2013, which was published in English on Jun. 26, 2014 as International Patent Publication WO 2014/095737 A1. International Application No. PCT/EP2013/076725 claims priority to European Application No. 12197525.4 filed Dec. 17, 2012.

The present invention relates to methods and apparatus for marking manufactured items. In particular, the present invention relates to marking packaged goods.

Counterfeit and contraband goods are a global problem for customers, manufacturers, and government authorities. Counterfeit goods, which are unauthorized productions of goods usually of inferior quality, are illegally sold all over the world. These goods are detrimental to the customer because they could be of inferior quality which may be hazardous (this is particularly important for products such as pharmaceuticals or other consumed goods). Counterfeit goods are detrimental to manufacturers because they may suffer a loss of reputation, an increase in competition from illegal manufacturers producing their products, and infringement of other legal rights. Contraband goods, which are goods manufactured for the purposes of evading taxes or government regulations, are also a considerable problem for manufacturers and government authorities. These goods are illegally diverted, traded, or imported which results in significant losses of revenue to government authorities due to improper collection of duties or taxes.

It is advantageous to be able to authenticate manufactured items using unique markings on the items without needing to store every unique marking at the location where the items are to be authenticated. It is also desirable to be able to detect counterfeit items, or items for which the unique marking of an authentic product has been copied, without needing to store an authentication record of each unique marking.

In one aspect of the disclosure, there is provided a method of marking a manufactured item, comprising:

creating a unique product identifier for a manufactured item;

creating one or more encryption keys;

generating a secret key using the unique product identifier and the one or more encryption keys;

generating a physical key from a measured physical property of the manufactured item;

generating a secure identifier derived from or incorporating the secret key and the physical key; and placing a mark on the manufactured item, the mark comprising the secure identifier or an identifier derived from the secure identifier.

The secure identifier may incorporate the unique product identifier.

Preferably, the method further includes the step of generating a system noise value using the secret key and the unique product identifier, wherein the secure identifier is derived from or incorporates the system noise value. Preferably the step of generating the system noise value comprises performing a hash function on the secret key and the unique product identifier.

Preferably, the method further includes generating a physical noise value using the physical key and the unique product identifier, wherein the secure identifier is derived from or incorporates the system noise value. Preferably the step of generating the physical noise value comprises performing a hash function on the physical key and the unique product identifier.

As used herein, "unique product identifier" means an identifier that uniquely identifies a manufactured item. Each manufactured item is given a different unique product identifier. The unique product identifier is typically a numerical or alphanumerical sequence or value.

As used herein, "encryption" means the process of transforming information using an algorithm to make that information unreadable to anyone except those possessing special knowledge in the form of an encryption key. Decryption is the reverse process. An "encryption key" is a piece of information that is used together with an encryption algorithm to encrypt or decrypt information. An encryption key is typically a numerical or alphanumerical sequence or value.

As used herein, the term "secret key" is used to describe a key used in a keyed hash that is generated using a unique product identifier and one or more additional keys or pieces of data. At the time it is generated, the secret key is not known by any other party than the party who created the secret key. The term "secret key" in this context is not limited to mean a private key in the context of an asymmetric encryption scheme.

As used herein, a "hash function" is a function that maps input data to a fixed size output (usually smaller than the input data) called a hash value. A hash function typically substitutes or transposes, or substitutes and transposes, the information to create the hash value or noise value. Preferably, the hash function is a cryptographic hash function. The cryptographic hash function produces a fingerprint or checksum of the input data. Two pieces of data can be assumed to be identical if using the same cryptographic hash function they produce the same hash value. Advantageously, the hash function is a one-way hash function, which means that it is computationally impossible to derive the input data from the hash value. These properties can be used in an authentication process, as will be described. A hash function can be keyed by combining a secret key and an input message in order to create a keyed hash value or noise.

As used herein the term "noise value" means a hash value, or a keyed hash value, or a value or character sequence derived directly from a hash value and a secret key.

The measured physical property of the manufactured item may be any measured physical property and may be based on mass, size, shape, surface texture or patterning, colour, chemical composition or response to a stimulus, such as response to electrical, magnetic or optical stimulus. The measured physical property is preferably chosen and measured to a resolution so that it is likely to be unique for each manufactured item, or at least is more likely to be different than the same for any two manufactured items. The measured physical property preferably provides a physical signature for the manufactured item. In a preferred embodiment the measured physical property is an image of a portion of the packaging of the manufactured item.

The secure identifier may be any type of identifier but is preferably a numerical or alphanumerical sequence or value. The mark may also be a sequence of characters or numbers or may be a graphical representation such as a one or two dimensional barcode.

In one embodiment, the step of generating the secure identifier comprises generating a first identifier by encrypting the unique product identifier together with the system noise value and generating the secure identifier by encrypting the first identifier together with the physical noise value.

In this embodiment, the method may further comprise authenticating the manufactured item at a verification centre, the step of authenticating comprising: identifying the mark on the item; decrypting the mark to derive the first identifier and the physical noise value; decrypting the first identifier to derive the unique product identifier and the system noise value; generating a new physical key from a measured physical property of the manufactured item; generating a new copy of the physical noise value by performing a hash function on the new physical key and the derived unique product identifier; comparing the new copy of the physical noise value with the derived physical noise value; and providing at indication of whether the derived physical noise value is identical to or correlates to the new copy of the physical noise value.

The step of comparing may comprise deriving a correlation score and the step of providing an indication comprises providing an indication of whether the correlation score is greater than a threshold value.

In this embodiment, the step of authenticating may further comprise: generating a new copy of the secret key from the unique product identifier and the one or more encryption keys; generating a new copy of the system noise value by performing a hash function on the new copy of the secret key and the unique product identifier; comparing the new copy of the system noise value with the derived system noise value; and providing an indication of whether the new copy of the system noise value and the derived system noise value are identical.

In another embodiment, the step of generating the secure identifier comprises generating a first secure identifier by encrypting the unique product identifier together with the system noise value; generating a second secure identifier by encrypting the unique product identifier together with the physical noise value; and placing a mark on the manufactured item, the mark comprising the first and second secure identifiers or an identifier or identifiers derived from the first and second secure identifiers.

In this embodiment, the method may further comprise authenticating the manufactured item at a verification centre, the step of authenticating comprising: identifying the mark on the item; decrypting the mark to derive the unique product identifier, the system noise value and the physical noise value; generating a new copy of the secret key from the unique product identifier and the one or more encryption keys; generating a new copy of the system noise value by performing a hash function on the new copy of the secret key and the unique product identifier; comparing the new copy of the system noise value with the derived system noise value; generating a new physical key from a measured physical property of the manufactured item; generating a new copy of the physical noise value by performing a hash function on the new physical key and the derived unique product identifier; comparing the new copy of the physical noise value with the derived physical noise value; and providing an indication of whether both the new copy of the system noise value is identical to the derived system noise value and the new copy of the physical noise value is identical to or correlates to the derived physical noise value.

In either embodiment, the step of generating the first secure identifier may comprise encrypting the unique product identifier and the system noise value using a code generator key, wherein the step of generating the second secure identifier comprises combining the first secure identifier and the physical noise value together with a code generator ID, and wherein the code generator key can be derived or obtained from a look-up table at a verification centre using the code generator ID.

In either embodiment, the method may further comprise the step of storing the one or more encryption keys at a verification centre. The one or more encryption keys may comprise a static key and a dynamic key, and wherein a new dynamic key is created for each batch of manufactured items whereas the same static key is used for plural batches of manufactured items The unique product identifier may include information identifying a batch of items to which the item belongs.

The invention provides the ability to authenticate both on basis of information from the manufacturer i.e. the various encryption keys, and on the basis of a physical property of the item. This provides two layers of authentication, and allows for the detection of cloning of identifiers on genuine items, but does not require large scale storage of authentication codes.

In another aspect of the invention, there is provided an apparatus for marking a manufactured item, comprising:

a key generator configured to generate encryption keys;

a code generator configured to generate a unique product identifier for each manufactured item;

a physical key generator configured to generate physical keys from a measured physical property of each manufactured item;

processing means configured to:

generate a secret key for each manufactured item using the unique product identifier and one or more encryption keys;

generate a secure identifier derived from or incorporating the secret key and the physical key; and a marker for marking each manufactured item with the secure identifier or an identifier derived from the secure identifier.

Preferably, the processor is configured to generate a system noise value for each manufactured item using the secret key and a unique product identifier, wherein the secure identifier is derived from or incorporates the system noise value. Preferably, the processor is configured to generate the system noise value for each manufactured item by performing a hash function on the secret key and a unique product identifier.

Preferably, the processor is configured to generate a physical noise value for each manufactured item using the physical key and the unique product identifier, wherein the secure identifier is derived from or incorporates the physical noise value. Preferably, the processor is configured to generate the physical noise value for each manufactured item by performing a hash function on the physical key and the unique product identifier.

In one embodiment the processing means is configured to: generate a first identifier for each manufactured item by encrypting the unique product identifier together with the secret key or the system noise value; and generate the secure identifier for each manufactured item by encrypting the first identifier together with the physical noise value.

In another embodiment, the processing means is configured to: generate a first secure identifier for each manufactured item by encrypting the unique product identifier together with the secret key or the system noise value and generate a second secure identifier for each manufactured item by encrypting the unique product identifier together with the physical key or the physical noise value; and the marker is configured to mark each manufactured item with the first secure identifier and the second secure identifier or an identifier or identifiers derived from the first and second secure identifiers.

The manufactured item may be a container containing a tobacco product. Examples of tobacco products are cigarettes, loose leaf tobacco, cigars, and cartridges or refills for electrically heated smoking systems or other e-cigarette systems.

The invention allows manufactured items to be authenticated without requiring storage of large volumes of information. This is important for any practical system suitable for authenticating items produced in high volumes. Furthermore, the use of a physical key in combination with a unique product identifier (UPI) increases security and makes the production of counterfeit and contraband goods more difficult. The addition of a physical key provides a system that can detect cloning and is difficult to replicate. Even if a counterfeiter had knowledge of the particular tool used to generate the physical key, the combination of the physical key with a UPI to produce an identifier makes cloning almost impossible. The invention also allows for authentication to be carried out online, i.e. connected to a verification centre over a communications network based on the system noise value, as well allowing authentication to be carried out offline based on the physical noise value. The marking required on each item is simply one or more codes and so adds very little expense to each item when compared to some other solutions, which rely on expensive labels that are technically difficult to reproduce.

Embodiments of the invention will now be described, by way of example only, with reference to the accompanying drawings, in which.

Unique markings on manufactured items can be used for tracking the items. For example, a customer order may be linked to the identifying label or labels of a particular shipping case or cases containing ordered goods. "Goods" in this context means manufactured items or other articles intended for distribution or sale to customers. This allows the customer, the manufacturer and any intermediaries to constantly track the location of the required goods. This may be achieved using scanners for scanning the identifiers and communicating with a verification centre. Alternatively, the identifiers can be read by a human, who can then manually communicate with a verification centre. Identifiers may also be used by customers, national authorities and other parties, to verify that a particular item contains genuine products. For example, a party may use a scanner to read the identifier on a shipping case (or the identifier can be read by a human, as discussed above). The identifier details may be sent to a verification centre. The verification centre can then lookup or otherwise process the identifier details, determine the shipping case production details and send those details to the scanner, thereby allowing the party to verify the shipping case, and the products contained therein, as genuine. In the event that the central database does not recognise the identifier, the party may suppose that the articles in question are counterfeit. The identifiers may also be used for tracing items. For example, if the manufacturer needs to recall the products from a selected number of shipping cases, those shipping cases can be traced using their identifiers.

Figure 1:
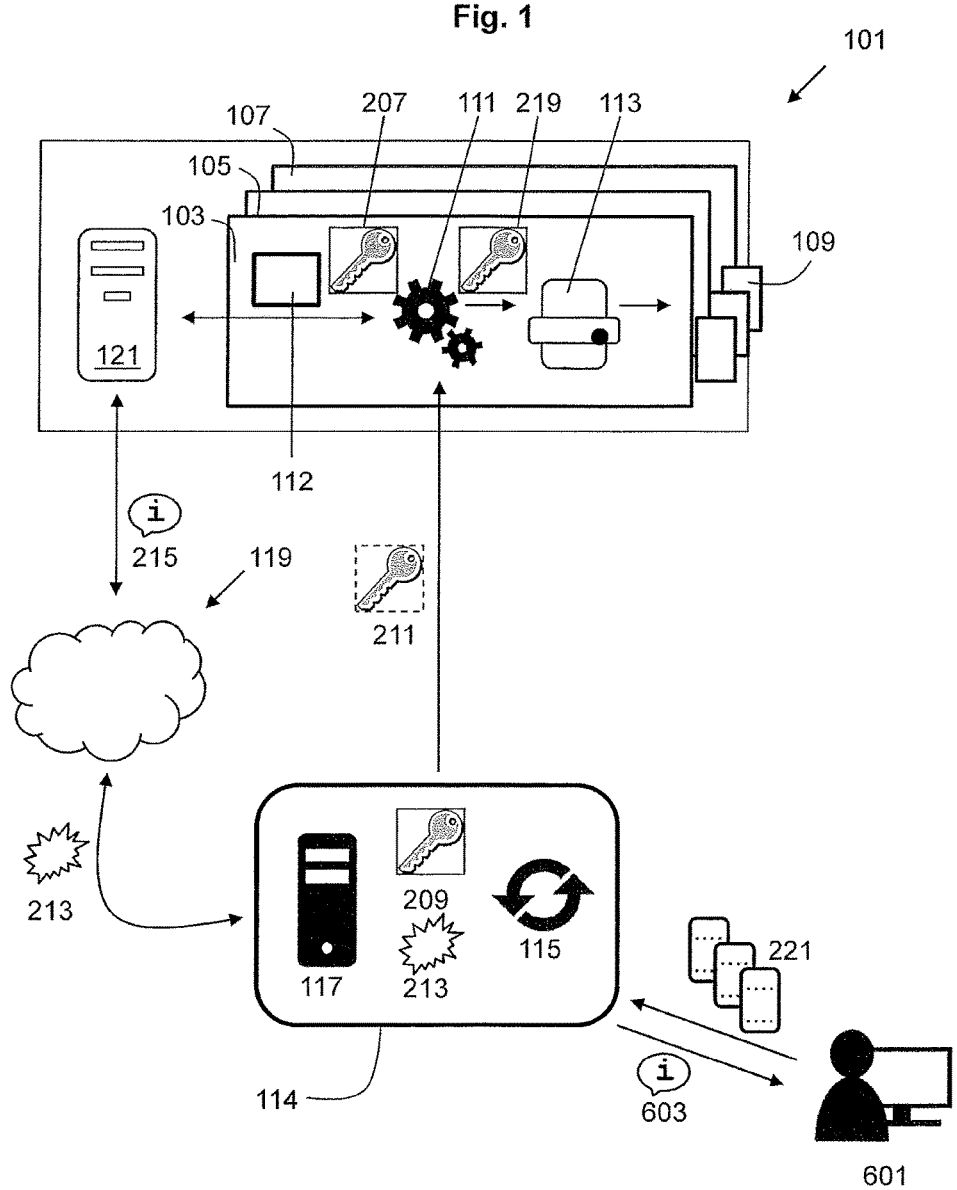
FIG. 1 is a schematic view of a marking system according to one embodiment of the invention.

FIG. 1 is a schematic view of a marking system according to one embodiment of the invention. In this embodiment, system 101 comprises one or more production centres 103, 105, 107 for producing manufactured items 109. Each production centre may comprise a production line or facility which may be a cigarette making and packaging line. Preferably, production is carried out in batches, each batch being dedicated to the production of a certain number of individual manufactured items. If there are two or more production centres, these may be physically located at the same or different manufacturing sites. In this preferred embodiment, the system includes production centres 103, 105, 107, but the invention may in fact be performed at an importation point, a distribution point, a purchaser, a wholesaler or any other point in the supply chain.

Each production centre includes a code generator 111 for generating codes for the manufactured items 109. Preferably, the code generator 111 is a fully autonomous computer or microcontroller dedicated to a particular production centre. Each production centre also includes a physical key generator 112 that measures or encodes a physical property of each manufactured item and converts that into a physical key 207. The code generator 111 uses the physical keys to generate codes for marking on the items.

In this embodiment, the physical key generator is of the type described in WO2007/071788. A portion of the packaging of each item is illuminated and an image of the illuminated portion captured by a digital image sensor. The portion of the packaging is chosen for its time stable, chaotic microstructure. Materials such as paper and cardboard have a chaotic microstructure which can be used as a "fingerprint" of the item. The image of the microstructure of the portion of the item is converted into a physical key or signature, as described in WO2007/071788, in the form of an alphanumeric value or matrix. A physical key generator of this type is available from Signoptic Technologies, Savoie Technolac, 5 allée Lac d'Aiguebelette BP340 F-73375, LE BOURGET-DU-LAC, France. However, any type of physical key generator may be used and might rely on other physical properties of the item such as mass or shape, or may even rely on chemical or biological properties of the item.

In this embodiment, each production centre also includes a marker 113 for marking the generated codes onto the manufactured items 109. The marker 113 may comprise any suitable marking means, for example but not limited to, a continuous ink jet printer, a drop-on-demand ink jet printer, a holographic printer, a laser printer, or any other printer or marker that allows printing or marking of the generated codes on the individual manufactured items. The printing or marking of the generated codes may be on each item, on an external package, on labels or in any other convenient way. In one embodiment, the generated codes are printed on adhesive tags or labels to be applied to the manufactured items, preferably non-removably. In one embodiment, the generated codes are printed by a laser beam on a layer of laser-sensitive material deposited on the manufactured item or on the item's packaging. This method allows a code to be impressed through a transparent wrapping layer.

The system 101 further comprises a verification centre 114 which includes a key generator 115 for generating keys 209, 211 for use in the marking and authenticating of the manufactured items and a central server 117. In this embodiment, the code generator 111 can communicate with the verification centre 114 via a secure internet connection 119 and a server 121 local to the production centre, or by other data communication means. Alternatively, the code generator 111 might communicate with the verification centre via a manufacturing portal dedicated to one or more production centres.

The key generator 115 generates a cryptographic key, herein referred to as a static key. The key generator 115 generates an unencrypted version of the static key and an encrypted version of the static key. The unencrypted version of the static key, herein referred to as the active static key 209, is shown with a solid border in FIG. 1. The encrypted version of the static key, herein referred to as the inactive static key 211, is shown with a dotted border in FIG. 1. The active static key 209, that is to say the unencrypted version of the static key, is generated in the key generator 115 and is therefore accessible to the central server 117. The key generator 115 sends the inactive static key 211 to the code generator 111 at the production centre 103, 105, 107.

The inactive static key 211 may be sent from the key generator 115 to the code generator 111 on a non-volatile data support, for example a CD-Rom, a DVD-Rom or a removable hard disk. The data support is physically transferred to the code generator 111 at the production centre 103, 105, 107. Alternatively, the inactive static key 211 may be sent from the key generator 115 to the code generator 111 via a secure network connection, for example one involving encryption. This may be on request from the code generator 111. This ensures authenticity, confidentiality and integrity of the static key.

The key generator 115 also generates the activation code 213, which comprises the key or code for decrypting the inactive static key 211 to form the active static key 209. This activation code 213 is also accessible to the central server 117. Preferably, the active static key 209 and activation code 213 are stored together with identification of the production centre 103, 105, 107 to which they are allocated.

In one embodiment, the static key comprises a number of portions. The primary portion may be a plurality of secret codes, for example a salt matrix. A salt matrix may be, for example, a long string of random or pseudorandom digits of characters. The number of portions may further include a unique identifier for the static key, a serialized code defining how the static key is to be combined with a dynamic key (discussed below), a digital cryptographic certificate associated the static key's unique identifier and a static key policy or licence that contains the digital cryptographic certificate generated above.

Preferably, the inactive static key, that is to say the encrypted version of the static key, and particularly the plurality of secret codes, is encrypted using a strong cipher. An example of a suitable cipher is the Triple DES (Data Encryption Standard) block cipher or the Triple DES/Rijandel block cipher. Both apply the Data Encryption Standard cipher algorithm three times to each data block and the Triple DES/Rijandel is a minor variation of the Triple DES which has been developed by IBM. In that case, the Triple DES or Triple Des/Rijandel key comprises the activation code 213. Thus, in a preferred embodiment, the active static key 209 is unencrypted, the inactive key 211 is encrypted using the Triple DES or Triple Des/Rijandel key, and the activation code 213 comprises that Triple DES or Triple Des/Rijandel key.

At next step 203, the inactive static key 211 received by the code generator 111 is registered. This is done by the code generator 111 sending to the verification centre 114 information 215 about the received static key and any relevant machine information (not shown). This is preferably sent via secure internet connection 119, as shown in FIG. 1, but may be sent by another suitable route. The verification centre 114 sends back to the code generator 111 the activation code 213. The activation code 213 allows the inactive static key 211 to be activated, and this is shown schematically at 217. The activation code 213 is preferably also sent via secure internet connection 119, as shown in FIG. 1. The registration procedure is preferably arranged such that the active static key 209 is never transferred over the internet.

The registration procedure may take the form of a conventional public/private key pair exchange mechanism. This may use an asymmetric key pair associated with the digital cryptographic certificate forming part of the static key, as discussed above. In that case, the public key of the asymmetric key pair may be in the form of a key issued by a third party, for example, a government authority. The information 215 about the received static key which is sent from the code generator 111 to the verification centre 114 may comprise the unique identifier for the static key which forms part of the static key, as discussed above. The relevant machine information (not shown) which is also sent from the code generator 111 to the verification centre 114 may comprise a unique identifier or certificate for the code generator 111 or production centre. That unique identifier may include information about the location and identity of the code generator or production centre, which has been pre-authorized for production. Preferably, the static key unique identifier and the code generator or production centre identifier are encrypted using the public key of the asymmetric key pair associated with the certificate of the static key.

Once the verification centre 114 receives the encrypted static key unique identifier and the code generator or production centre identifier, the verification centre 114 can decrypt using the private key of the asymmetric key pair associated with the certificate of the static key. The verification centre may then check that the static key unique identifier and the code generator or production centre identifier are valid. Then, the verification centre 114 sends back to the code generator 111 the activation code 213. As already mentioned, preferably, the activation code 213 is in the form of a Triple DES or Triple DES/Rijandel cipher. The verification centre encrypts the activation code (for example the Triple DES or Triple DES/Rijandel cipher) with the public key of the asymmetric key pair associated with the certificate of the static key. This allows the activation code (for example the Triple DES or Triple DES/Rijandel cipher) to be decrypted by the code generator using the private key of the asymmetric key pair associated with the certificate of the static key. Then, the inactive static key 211 can be activated using the decrypted activation code 213 in order to form the active static key 209.

Once the inactive static key 211 at the code generator 111 has been activated, the production centre is able to manufacture items and produce codes for the manufactured items at the code generator 111.

The code generator 111 generates a new key, herein referred to as dynamic key 219, for each batch of manufactured items. The dynamic key 219 is preferably a random secret code, such as a random number. The code generator uses the dynamic key 219 for a batch, together with the active static key 209, to generate a secret key 223. The secret key 223 is the n used in combination with the physical keys and a unique product identifier (UPI) for each item to generate codes 221 (for example alpha-numeric codes) to be marked onto the manufactured items in that batch. In this embodiment, the UPI for each item comprises production details identifying the time of production together with an incremental counter value to distinguish items produced within a single time period by the same production centre.

The code generator uses a cryptographic hash function on a combination of the UPI with the secret key and a combination of the UPI with the physical key. This creates digital fingerprints, referred to herein as "noise values", for the item, and these noise values are used to generate the codes 221 that are marked on the items by marker 113. In addition to commonly used cryptographic hash functions, a variety of techniques are available for generating the hash values or noise values, including, but not limited to: transposition, substitution, table substitution and indexing.

Figure 2:
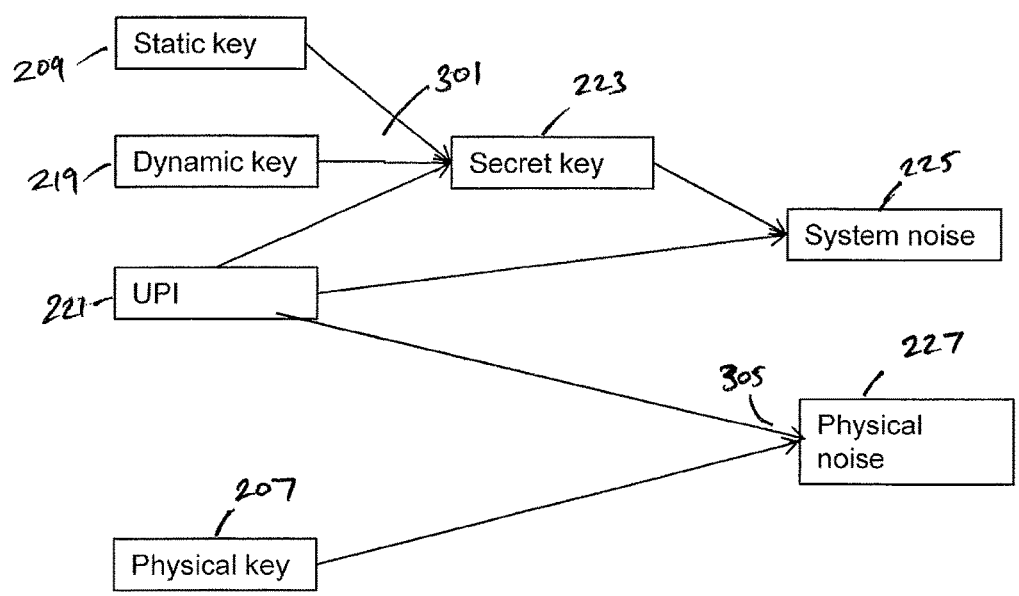
FIG. 2 illustrates how the system noise value and physical noise value are derived.

FIG. 2 illustrates the method of generating the noise values carried out by the code generator 111. To generate the system noise value 225, the secret key is first derived from the active static key 209, the dynamic key 219 and the UPI 221. The dynamic key 219 and the active static key 209 are known only to the verification centre 114 and the code generator 111. In step 301 the dynamic key and the UPI are used to extract the secret key from the salt matrix contained in the static key, in accordance with the serialized code within the static key. The secret key 223 and UPI 221 are then hashed in step 303 to produce the system noise for the item. To generate the physical noise value 227, the physical key 207 is hashed with the UPI 221 in step 305. The hash function used to generate the system noise value may be the same or different to the hash function used to generate the physical noise value.

Figure 3:
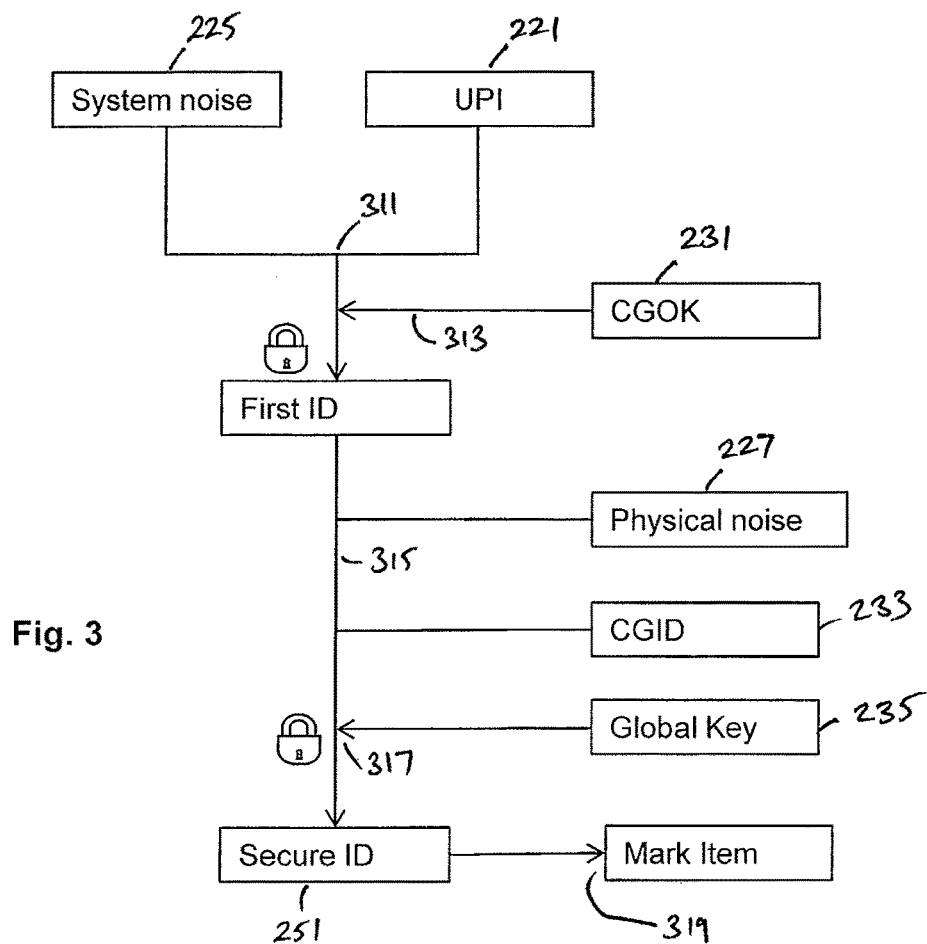
FIG. 3 is a flow chart showing a marking method of one embodiment of the invention, which may be carried out on the system of FIG. 1.

FIG. 3 illustrates a method of using the system noise value and physical noise value to generate a secure identifier for each item in accordance with a first embodiment of the invention. In step 311 the system noise value 225 and the UPI 221 are combined. In step 313 the combined system noise value and UPI is encrypted by the code generator obfuscation key (CGOK) 231 to produce a first identifier 241. The CGOK is particular to the code generator and is pre-loaded onto the code generator. The first identifier 241 is then combined with the physical noise value 227 and a code generator identifier 233. The code generator identifier (CGID) 233 will allow the CGOK to be obtained during authentication. The combination of the first identifier, the physical noise value and the CGID is then encrypted using a global key 235 in step 317 to produce the secure identifier 251. The global key 235 is common to all production centres, and may be part of a symmetric or asymmetric key pair known by the verification centre. The secure identifier 251 is then marked on the item in step 319 by marker 113.

The code generator 111 or production centre 103, 105, 107 keeps a count of the codes which are marked onto the manufactured items. In addition, the code generator 111 sends the dynamic key 219 for each batch, together with information about the batch (not shown), to the verification centre 114. This may be performed via secure internet connection 119. The information about the batch may include various pieces of information, for example but not limited to brand, intended market or intended destination. The dynamic keys 219 do not need to be sent to the verification centre 114 in real-time and can be communicated to the verification centre at any appropriate time, for example monthly. The dynamic keys 219 sent to the verification centre 114 are stored in a database (for example at central server 117) at or accessible from the verification centre 114. The dynamic key 219 for each batch is preferably stored together with the batch information sent to the verification centre 114 at the same time.

Preferably, the active static key 209 is deleted when the code generator 111 at a particular production centre 103, 105, 107 is put out of service. This prevents a malicious user from gaining access to the active static key 209 without proper registration. Additional means for disabling the code generator 111 and preventing unauthorized use of the code generator 111 and production centre may be provided.

Figure 4:
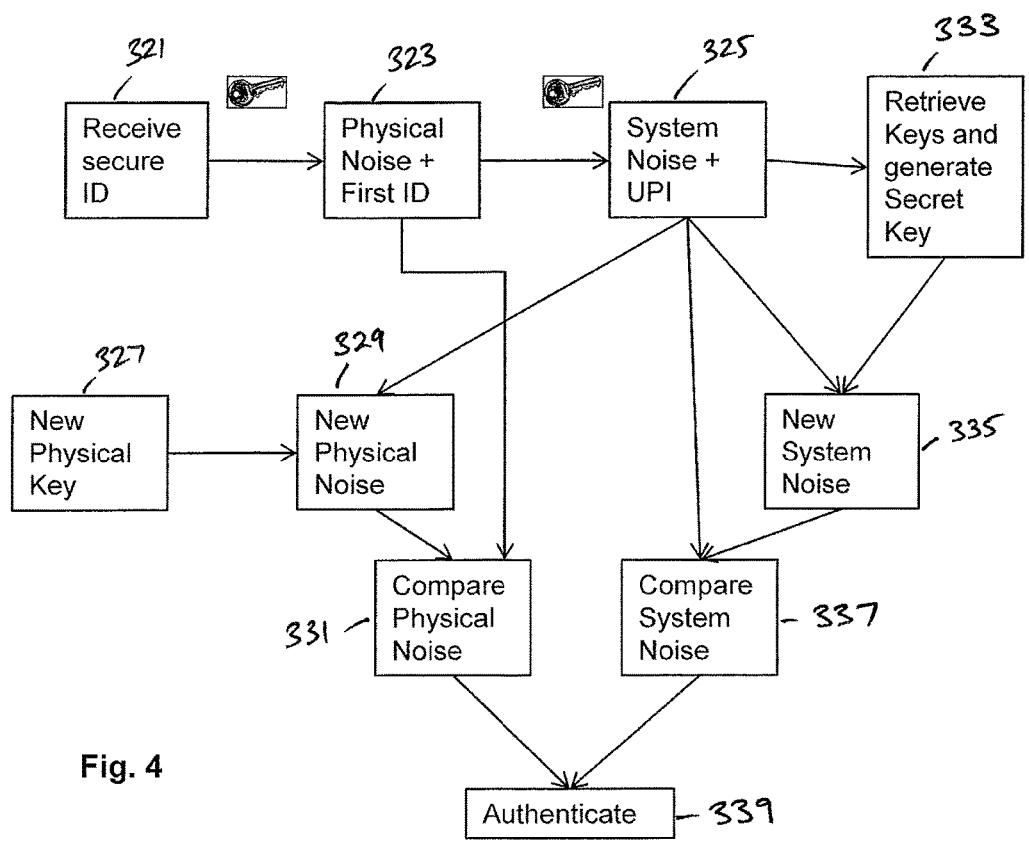
FIG. 4 is a flow chart showing an authentication method for the embodiment of the invention shown in FIG. 3, which may be carried out on the system of FIG. 1.

FIG. 4 illustrates the steps carried out by the verification centre 114 and by the user 601 when a user 601 wishes to authenticate an individual manufactured item marked in accordance with the process of FIG. 3. The user 601 reads the code 221 on the item and sends it to the verification centre 114. This is shown in FIG. 1. The user 601 may send the code to the verification centre 114 by any suitable means such as a secure or non-secure internet connection.

The verification centre receives the secure identifier in step 321. The secure identifier is decrypted using the global key 235 (or the corresponding key in the key pair if asymmetric keys are used) in step 323 to reveal the physical noise value 227 and the first identifier 241. The CGID is also revealed. Using a look-up table, the CGOK 231 is then obtained from the CGID. The first ID is then decrypted in step 325 using the CGOK 231 to reveal the system noise 225 and the UPI 221. With this information, together with the active static key 209 and dynamic key 219 and a new physical key, both the physical noise value and the system noise value can be recreated to authenticate the item.

To recreate the physical noise value a new physical key must be obtained by the user 601 in step 327 by recording an image of the portion of the item in the same manner and under the same conditions as used to generate the original physical key 207. The UPI and new physical key are then hashed to generate a new physical noise value in step 329. In step 331, the new physical noise is compared with the extracted physical noise value revealed in step 323. If the new physical noise value is sufficiently similar to the extracted physical noise value then one part of the authentication process is completed. If the new physical noise value is not sufficiently similar to the extracted physical noise value then the item is determined to be not authentic in step 339.

The new physical noise value may be required to be identical to the extracted physical noise value in order for the item to be considered authentic. However, it is possible to allow for some differences between the new physical noise value and the extracted physical noise value by using a correlation score and requiring a threshold correlation score in order to consider the item authentic. US2005/0257064 describes a suitable statistical method to calculate a degree of correlation or similarity between two digital signatures derived from measured physical properties of a fibrous medium.

It is possible for either the user 601 or the verification centre 114 to carry out step 329 and 331. If the user 601 is provided with the UPI by the verification centre, the end user can authenticate the item based on the physical noise value. Similarly, if the new physical key is provided to the verification centre 114, the verification centre can authenticate the item based on the physical noise value.

To recreate the system noise value, the secret key must be regenerated, In step 333, using the UPI and the CGID, the verification centre 114 is able to retrieve the dynamic key 219 and the active static key 209 from records held at the verification centre. The secret key can then be regenerated using the UPI 221, the dynamic key 219 and the active static key 209. In step 335 a new system noise value is recreated by hashing the UPI and the secret key. In step 337 the new system noise value is compared to the system noise value extracted in step 325. If the new system noise value and the extracted system nose value are identical the item can be determined to be authentic in step 339.

In one embodiment, both the physical noise value and the system noise value comparisons are required in order for an item to be considered authentic. However, it is possible to allow authentication on the basis of only one of these checks if desired.

From the derived active static key 209, the production centre 103, 105, 107 at which the item was manufactured can be determined, since the active static keys are preferably stored in the verification centre together with details of their associated production centres. From the derived dynamic key 219, the batch information for the item can be determined since the dynamic keys are preferably stored in the verification centre together with the associated batch information. Thus, the verification centre 114 can derive, from the code 221 sent from user 601, various pieces of information 603 about the individual item as well as checking the authenticity of the item. Then all, or selected portions of, the information 603 including an indication of whether or not the item is authentic can be sent to the user 601. This is shown in FIG. 1. The information 603 is preferably sent to the user 601 via the same means as the original code was sent.

Figure 5:
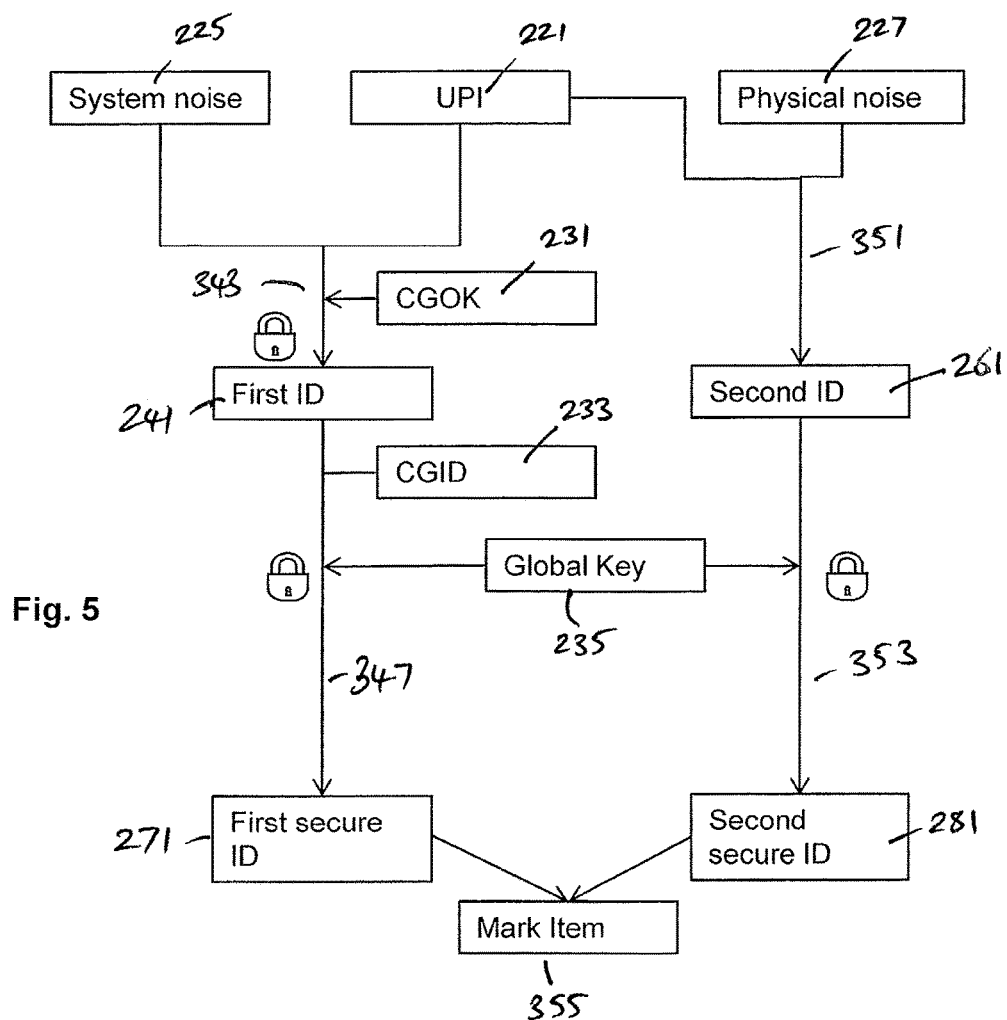
FIG. 5 is a flow chart showing a marking method of another embodiment of the invention, which may be carried out on the system of FIG. 1.

FIG. 5 illustrates a marking process in accordance with a second embodiment of the invention. In the method of FIG. 5 two secure identifiers are produced, one based on the system noise value 225 and another based on the physical noise value 227. The system noise value 225 is combined with the UPI 221 in step 341. The combination of the system noise value and the physical noise value is then encrypted with the CGOK 231 in step 343 to produce the first ID 241 as in the first embodiment of FIG. 3. The first ID 241 is then combined with the CGID in step 345 and encrypted with the global key 235 in step 347 to produce a first secure ID 271. The Physical noise value 227 is combined with the UPI in step 221 to produce a second ID 261. The second ID is encrypted with the global key 235 in step 353 to produce a second secure ID. The item can then be marked in step 355 with the first secure ID 271 and the second secure ID 281, or with a mark or marks derived from a combination of the first secure ID 271 and the second secure ID 281.

Figure 6:
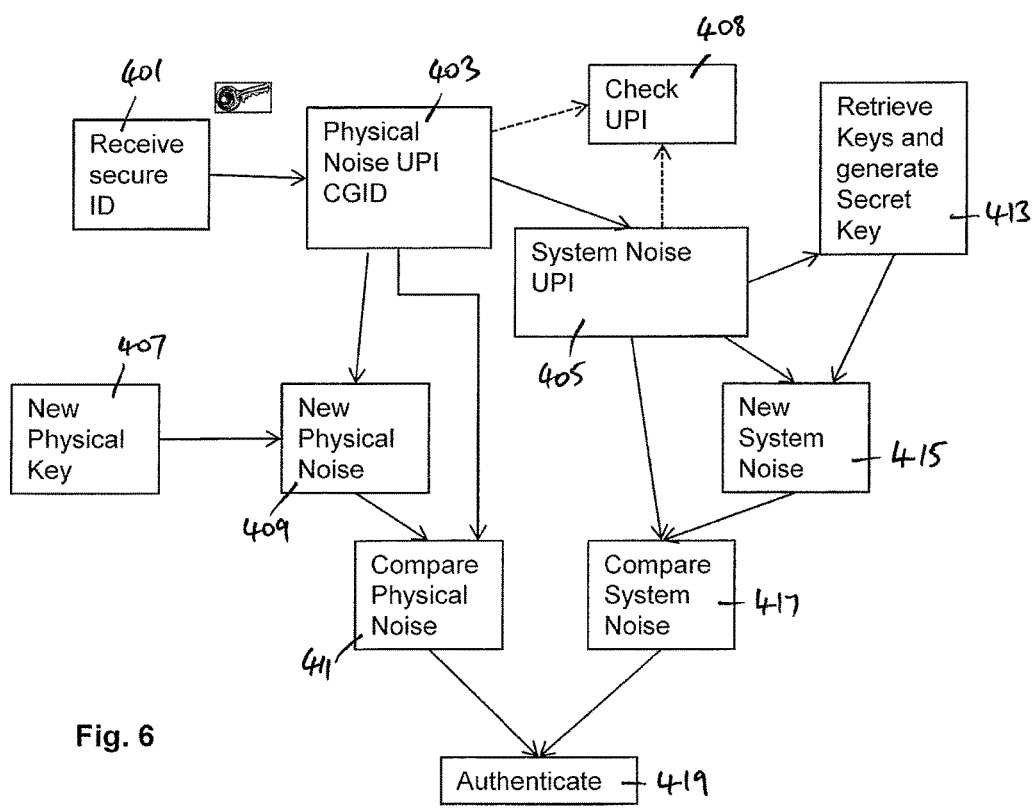
FIG. 6 is a flow chart showing an authentication method for the embodiment of the invention shown in FIG. 5, which may be carried out on the system of FIG. 1.

FIG. 6 illustrates the steps carried out to authenticate an item marked using the process illustrated in FIG. 5. In step 401 the mark or marks are read by the user and the user derives the first secure identifier 271 and second secure identifier 281. In step 403, the global key 235 is used to derive the physical noise value 227, a first copy of the UPI 221, the first ID 241 and CGID 233. If the user has the global key 235, the user can authenticate the item based on the second secure identifier offline, i.e. without requiring connection to the verification centre. The user generates a new physical key in step 407 and this is hashed with the UPI to generate a new physical noise value in step 409. The user can compare the new physical noise value with the physical noise value extracted in step 403 in step 411. As described with reference to FIG. 3, the item can be considered authentic in step 419 if the new physical noise value is the same as, or sufficiently similar to, the extracted physical noise value.

In step 405 the CGID is used by the verification centre to retrieve the CGOK 231, and the CGOK is used to decrypt the first ID 241 to reveal the system noise and a second copy of the UPI. In step 408, the second copy of the UPI can optionally be compared to the second copy of the UPI as a check. In step 423, the verification centre 114 retrieves the dynamic key 219 and active static key 209 using the CGID and UPI. In step 415 a new system noise value is generated by first regenerating a secret key from the UPI, dynamic key and static key, and then by hashing the secret key with the UPI. In step 417 the new system noise value is compared to the system noise value extracted in step 405. If they are identical the item can be authenticated in step 419. As with the embodiment of FIG. 3, authentication based both on the system noise value and the physical noise value may be required for an item to be considered authentic.

Although the invention has been described with reference to cigarette manufacture, it should be clear that the invention is applicable to any products that require authentication, such as pharmaceutical, alcoholic beverages and luxury goods.

The invention claimed is:

1. A method of marking a manufactured item, comprising:
creating a unique product identifier for a manufactured item;
creating one or more encryption keys;
generating a secret key using the unique product identifier and the one or more encryption keys;
generating a system noise value using the secret key and the unique product identifier;
generating a physical key from a measured physical property of the manufactured item;
generating a physical noise value using the physical key and the unique product identifies, wherein generating each of the system noise value and the physical noise value, respectively, comprises using transposition, substitution, table substitution and indexing, or a cryptographic hash function on a combination of the unique product identifier with the secret key with respect to the system noise value and on a combination of the unique product identifier with the physical key with respect to the physical noise value;
generating a secure identifier derived from or incorporating the secret key and the physical key, wherein the secure identifier is derived from or incorporates the system noise value and the physical noise value; and
placing a mark on the manufactured item, the mark comprising the secure identifier or an identifier derived from the secure identifier.

2. The method according to claim 1, wherein the secure identifier is derived from or incorporates the unique product identifier.

3. The method according to claim 1, wherein the step of generating the secure identifier comprises generating a first identifier by encrypting the unique product identifier together with the system noise value and generating the secure identifier by encrypting the first identifier together with the physical noise value.

4. The method according to claim 3, further comprising authenticating the manufactured item at a verification centre, the step of authenticating comprising:
identifying the mark on the item;
decrypting the mark to derive the first identifier and the physical noise value;
decrypting the first identifier to derive the unique product identifier and the system noise value;

generating a new physical key from a measured physical property of the manufactured item;
generating a new copy of the physical noise value by performing a hash function on the new physical key and the derived unique product identifier;
comparing the new copy of the physical noise value with the derived physical noise value; and
providing at indication of whether the derived physical noise value is identical to or correlates to the new copy of the physical noise value.

5. The method according to claim 4, the step of authenticating further comprising:
generating a new copy of the secret key from the unique product identifier and the one or more encryption keys;
generating a new copy of the system noise value by performing a hash function on the new copy of the secret key and the unique product identifier;
comparing the new copy of the system noise value with the derived system noise value; and
providing an indication of whether the new copy of the system noise value and the derived system noise value are identical.

6. The method according to claim 1, wherein the step of generating the secure identifier comprises generating a first secure identifier by encrypting the unique product identifier together with the system noise value;
generating a second secure identifier by encrypting the unique product identifier together with the physical noise value; and
placing a mark on the manufactured item, the mark comprising the first and second secure identifiers or an identifier or identifiers derived from the first and second secure identifiers.

7. The method according to claim 6, further comprising authenticating the manufactured item at a verification centre, the step of authenticating comprising:
identifying the mark on the item;
decrypting the mark to derive the unique product identifier, the system noise and the physical noise;
generating a new copy of the secret key from the unique product identifier and the one or more encryption keys;
generating a new copy of the system noise value by performing a hash function on the new copy of the secret key and the unique product identifier;
comparing the new copy of the system noise value with the derived system noise value;
generating a new physical key from a measured physical property of the manufactured item;
generating a new copy of the physical noise value by performing a hash function on the new physical key and the derived unique product identifier;
comparing the new copy of the physical noise value with the derived physical noise value; and
providing an indication of whether both the new copy of the system noise value is identical to the derived system noise value and the new copy of the physical noise value is identical to or correlates to the derived physical noise value.

8. The method according to claim 1, wherein the one or more encryption keys comprise a static key and a dynamic key, and wherein a new dynamic key is created for each batch of manufactured items.

9. The method according to claim 1, wherein the unique product identifier includes information identifying a batch of items to which the item belongs.

10. An apparatus for marking a manufactured item, comprising:

key generator software configured to generate encryption keys;
a code generator computer or microcontroller configured to generate a unique product identifier for each manufactured item;
physical key generator hardware configured to generate physical keys from a measured physical property of each manufactured item;
a processor configured to receive the encryption keys, the unique product identifier, and the physical keys, and configured to:
generate a secret key for each manufactured item using the unique product identifier and one or more encryption keys;
generate a system noise value for each manufactured item by performing a hash function on the secret key and the unique product identifier;
generate a physical noise value for each manufactured item by performing a hash function on the physical key and the unique product identifier;
generate a secure identifier derived from or incorporating the secret key and the physical key, wherein the secure identifier is derived from or incorporates the system noise value and the physical noise value; and
marking hardware configured to receive the secure identifier, or an identifier derived from the secure identifier, from the processor and configured to mark each manufactured item with the secure identifier or the identifier derived from the secure identifier.

11. The apparatus according to claim 10, wherein the manufactured item is a container containing a tobacco product.

12. The method according to claim 1, further comprising generating a physical noise value using the physical key and the unique product identifier, wherein the secure identifier is derived from or incorporates the system noise value.

13. The method according to 12, wherein the secure identifier incorporates the unique product identifier.

14. The apparatus according to claim 10, wherein the processor is configured to generate a physical noise value for each manufactured item by performing a hash function on the physical key and the unique product identifier, wherein the secure identifier is derived from or incorporates the physical noise value.

15. The method according to claim 1, wherein the manufactured item is a container containing a tobacco product.

16. A method of marking a manufactured item, comprising:
creating a unique product identifier for a manufactured item;
creating one or more encryption keys;
generating a secret key using the unique product identifier and the one or more encryption keys;
generating a physical key from a measured physical property of the manufactured item;
generating a system noise value using the secret key and the unique product identifier;
generating a physical noise value using the physical key and the unique product identifier;
generating a secure identifier derived from or incorporating the secret key and the physical key, wherein generating the secure identifier comprises generating a first identifier by encrypting the unique product identifier together with the system noise value and generating the secure identifier by encrypting the first identifier together with the physical noise value;

placing a mark on the manufactured item, the mark comprising the secure identifier or an identifier derived from the secure identifier; and authenticating the manufactured item at a verification centre, wherein authenticating the manufactured item comprises:

identifying the mark on the item;

decrypting the mark to derive the first identifier and the physical noise value;

decrypting the first identifier to derive the unique product identifier and the system noise value;

generating a new physical key from a measured physical property of the manufactured item;

generating a new copy of the physical noise value by performing a hash function on the new physical key and the derived unique product identifier;

comparing the new copy of the physical noise value with the derived physical noise value; and providing an indication of whether the derived physical noise value is identical to or correlates to the new copy of the physical noise value.

17. The method according to claim 3, wherein:
generating the first identifier by encrypting the unique product identifier together with the system noise value comprises:

encrypting by a code generator obfuscation key;

combining the first identifier with the physical noise value and a code generator identifier; and encrypting the combination of the first identifier, the physical noise value, and the code generator identifier using a global key to produce the secure identifier.

18. The method according to claim 17, wherein the code generator obfuscation key is particular to a code generator on which it is preloaded and wherein the global key is common to all of one or more production centres.

19. The method according to claim 6, wherein:

the system noise value is combined with the unique product identifier;

the combination of the system noise value and the unique product identifier is encrypted with a code generator obfuscation key to produce a first identifier;

the first identifier is combined with a code generator identifier and encrypted with a global key to produce a first secure identifier;

the physical noise value is combined with the unique product identifier to produce a second identifier; and the second identifier is encrypted with the global key to produce a second secure identifier.

20. The method according to claim 16, wherein the manufactured item is a container containing a tobacco product.

21. The method according to claim 16, wherein authenticating further comprises:

generating a new copy of the secret key from the unique product identifier and the one or more encryption keys;

generating a new copy of the system noise value by performing a hash function on the new copy of the secret key and the unique product identifier;

comparing the new copy of the system noise value with the derived system noise value; and providing an indication of whether the new copy of the system noise value and the derived system noise value are identical.

22. A method of marking a manufactured item, comprising:

creating a unique product identifier for a manufactured item;

creating one or more encryption keys;

generating a secret key using the unique product identifier and the one or more encryption keys;

generating a physical key from a measured physical property of the manufactured item;

generating a system noise value using the secret key and the unique product identifier;

generating a physical noise value using the physical key and the unique product identifier;

generating a secure identifier derived from or incorporating the secret key and the physical key;

wherein generating the secure identifier comprises:

generating a first secure identifier by encrypting the unique product identifier together with the system noise value; and generating a second secure identifier by encrypting the unique product identifier together with the physical noise value;

placing a mark on the manufactured item, the mark comprising the first and the second secure identifiers or an identifier or identifiers derived from the first and the second secure identifiers; and authenticating the manufactured item at a verification centre, wherein authenticating comprises:

identifying the mark on the item;

decrypting the mark to derive the unique product identifier, the system noise value, and the physical noise value;

generating a new copy of the secret key from the unique product identifier and the one or more encryption keys;

generating a new copy of the system noise value by performing a hash function on the new copy of the secret key and the unique product identifier;

comparing the new copy of the system noise value with the derived system noise value;

generating a new physical key from a measured physical property of the manufactured item;

generating a new copy of the physical noise value by performing a hash function on the new physical key and the derived unique product identifier;

comparing the new copy of the physical noise value with the derived physical noise value; and providing an indication of whether both the new copy of the system noise value is identical to the derived system noise value and the new copy of the physical noise value is identical to or correlates to the derived physical noise value.

23. The method according to claim 1, wherein the measured physical property of the manufactured item is based on surface texture of the manufactured item.

24. The apparatus of claim 10, wherein the measured physical property of the manufactured item is based on surface texture of the manufactured item.

* * * * *

UNITED STATES PATENT AND TRADEMARK OFFICE
CERTIFICATE OF CORRECTION

PATENT NO. : 10,121,151 B2
APPLICATION NO. : 14/648351
DATED : November 6, 2018
INVENTOR(S) : Chanez et al.

Page 1 of 1

It is certified that error appears in the above-identified patent and that said Letters Patent is hereby corrected as shown below:

In the Claims

Column 12, Line 35, "identifies" should be "identifier"

Signed and Sealed this
Second Day of April, 2019

Andrei Iancu
*Director of the United States Patent and Trademark Office*